US012322253B2

(12) United States Patent
Leggett et al.

(10) Patent No.: US 12,322,253 B2
(45) Date of Patent: Jun. 3, 2025

(54) GAMING MACHINE WITH HIERARCHICAL COLLECTOR FEATURE

(71) Applicant: LNW Gaming, Inc., Las Vegas, NV (US)

(72) Inventors: Sarah Leggett, Chicago, IL (US); Jeremy Hornik, Chicago, IL (US)

(73) Assignee: LNW Gaming, Inc., Las Vegas, NV (US)

( * ) Notice: Subject to any disclaimer, the term of this patent is extended or adjusted under 35 U.S.C. 154(b) by 93 days.

(21) Appl. No.: 17/884,645

(22) Filed: Aug. 10, 2022

(65) Prior Publication Data

US 2024/0054861 A1 Feb. 15, 2024

(51) Int. Cl.
*G07F 17/32* (2006.01)
*G07F 17/34* (2006.01)

(52) U.S. Cl.
CPC ...... *G07F 17/3267* (2013.01); *G07F 17/3211* (2013.01); *G07F 17/34* (2013.01)

(58) Field of Classification Search
None
See application file for complete search history.

(56) References Cited

U.S. PATENT DOCUMENTS 3,733,075 A 5/1973 Burnside et al.
5,342,047 A 8/1994 Heidel et al.
(Continued)

FOREIGN PATENT DOCUMENTS

AU 2015210489 A1 2/2016
GB 2097160 B 5/1984
(Continued)

OTHER PUBLICATIONS

Circa Resort & Casino, “1st Time Playing Double Up Lucky Win,” YouTube.com, <https://www.youtube.com/watch?v=mfSebV2cxhA&t=349s>, accessed Jul. 28, 2022.
(Continued)

*Primary Examiner* — Peter J Iannuzzi

(57) ABSTRACT

There is provided an example gaming system (and method) that utilizes a presentation assembly configured to present a plurality of reels. The plurality of reels bear a plurality of symbols including value-bearing symbols and at least two special symbols. The at least two special symbols comprise at least a first special symbol and a second special symbol. The plurality of symbols are ranked according to a hierarchy. The value-bearing symbols have a lowest rank in the hierarchy. The at least two special symbols have ranks higher than the lowest rank. Each of the at least two special symbols has a different rank from each other within the hierarchy. Furthermore, each one of the at least two special symbols is configured to collect symbols of a lesser rank than its own rank. Game-logic circuitry conducts a series of spins of the plurality of reels, each spin including spinning and stopping the plurality of reels to randomly land at least some of the plurality of symbols. A first one of the series of spins lands, via the game-logic circuitry, a set of the value-bearing symbols. In response to a second one the series of spins landing the first special symbol, collecting, via automated animation by the game-logic circuitry, the set of the value-bearing symbols into the first special symbol.

20 Claims, 16 Drawing Sheets

(56) References Cited

U.S. PATENT DOCUMENTS

| | | | | |
|---|---|---|---|---|
| 5,356,140 | A | 10/1994 | Dabrowski et al. | |
| 5,393,061 | A | 2/1995 | Manship et al. | |
| 5,704,835 | A | 1/1998 | Dietz | |
| 5,833,537 | A | 11/1998 | Barrie | |
| 5,951,397 | A | 9/1999 | Dickinson | |
| 6,056,642 | A | 5/2000 | Bennett | |
| 6,517,433 | B2 | 2/2003 | Loose et al. | |
| 6,641,477 | B1 | 11/2003 | Dietz | |
| 6,910,962 | B2 | 6/2005 | Marks et al. | |
| 7,018,293 | B2 | 3/2006 | Brown et al. | |
| 7,029,396 | B2 | 4/2006 | Jaffe et al. | |
| 7,452,276 | B2 | 11/2008 | Loose et al. | |
| 7,503,847 | B2 | 3/2009 | Baerlocher | |
| 7,553,231 | B2 | 6/2009 | Rodgers et al. | |
| 7,604,538 | B2 | 10/2009 | Pacey | |
| 7,654,899 | B2 | 2/2010 | Durham et al. | |
| 8,057,303 | B2 | 11/2011 | Rasmussen et al. | |
| 8,083,581 | B2 | 12/2011 | Marks et al. | |
| 8,105,151 | B2 | 1/2012 | Caputo et al. | |
| 8,162,741 | B2 | 4/2012 | Wadleigh et al. | |
| 8,192,275 | B2 | 6/2012 | Aoki et al. | |
| 8,226,459 | B2 | 7/2012 | Barrett et al. | |
| 8,287,357 | B2 | 10/2012 | Evans | |
| 8,323,091 | B2 | 12/2012 | Frank et al. | |
| 8,357,041 | B1 | 1/2013 | Saunders | |
| 8,360,851 | B2 | 1/2013 | Aoki et al. | |
| 8,366,538 | B1 | 2/2013 | Saunders et al. | |
| 8,371,930 | B1 | 2/2013 | Saunders et al. | |
| 8,414,380 | B2 | 4/2013 | Saunders et al. | |
| 8,465,358 | B2 | 6/2013 | Kemper | |
| 8,496,522 | B2 | 7/2013 | Caputo et al. | |
| 8,512,138 | B2 | 8/2013 | Saunders | |
| 8,523,659 | B2 | 9/2013 | Evans | |
| 8,574,059 | B2 | 11/2013 | Rodgers et al. | |
| 8,591,330 | B2 | 11/2013 | Kelly et al. | |
| 8,608,545 | B2 | 12/2013 | Arora et al. | |
| 8,662,986 | B2 | 3/2014 | Rodgers et al. | |
| 8,690,660 | B2 | 4/2014 | Saunders et al. | |
| 8,790,169 | B2 | 7/2014 | Saunders | |
| 8,851,974 | B2 | 10/2014 | Caputo et al. | |
| 8,870,642 | B2 | 10/2014 | Leupp et al. | |
| 8,882,578 | B2 | 11/2014 | Saunders | |
| 8,961,291 | B2 | 2/2015 | Dias Pires et al. | |
| 9,005,022 | B2 | 4/2015 | Saunders | |
| 9,165,433 | B2 | 10/2015 | Caputo | |
| 9,230,410 | B2 | 1/2016 | Saunders et al. | |
| 9,245,421 | B2 | 1/2016 | Saunders et al. | |
| 9,251,667 | B2 | 2/2016 | Marks et al. | |
| 9,257,017 | B2 | 2/2016 | Saunders et al. | |
| 9,262,895 | B2 | 2/2016 | Rodgers et al. | |
| 9,275,524 | B2 | 3/2016 | Nicely | |
| 9,299,224 | B2 | 3/2016 | Leupp | |
| 9,311,781 | B2 | 4/2016 | Edwards | |
| 9,349,251 | B2 | 5/2016 | Caputo et al. | |
| 9,355,528 | B2 | 5/2016 | Nicely | |
| 9,418,521 | B1 | 8/2016 | Henrick et al. | |
| 9,424,720 | B2 | 8/2016 | Suda | |
| 9,928,691 | B2 | 3/2018 | Olive | |
| 10,037,651 | B2 | 7/2018 | You et al. | |
| 10,339,761 | B2 | 7/2019 | Olive | |
| 10,388,112 | B2 | 8/2019 | You et al. | |
| 2001/0031659 | A1* | 10/2001 | Perrie | A63F 3/00643 463/18 |
| 2002/0045474 | A1* | 4/2002 | Singer | G07F 17/3216 463/20 |
| 2002/0119818 | A1 | 8/2002 | Savio et al. | |
| 2003/0216165 | A1 | 11/2003 | Singer et al. | |
| 2004/0137982 | A1 | 7/2004 | Cuddy et al. | |
| 2004/0204228 | A1* | 10/2004 | Walker | G07F 17/3244 463/20 |
| 2006/0189369 | A1 | 8/2006 | Taylor | |
| 2007/0060248 | A1 | 3/2007 | Rodgers et al. | |
| 2007/0129135 | A1 | 6/2007 | Marks et al. | |
| 2008/0003278 | A1 | 1/2008 | Mondelo | |
| 2008/0004532 | A1 | 1/2008 | Rubey et al. | |
| 2008/0032784 | A1 | 2/2008 | Englman | |
| 2008/0045298 | A1 | 2/2008 | Yoshizawa | |
| 2008/0045320 | A1 | 2/2008 | Kato | |
| 2008/0076558 | A1* | 3/2008 | Okada | G07F 17/323 463/43 |
| 2008/0108431 | A1 | 5/2008 | Cuddy et al. | |
| 2009/0082080 | A1* | 3/2009 | Bennett | G07F 17/34 463/16 |
| 2009/0239634 | A1 | 9/2009 | Nguyen | |
| 2009/0291741 | A1 | 11/2009 | Schofield | |
| 2010/0029381 | A1* | 2/2010 | Vancura | G07F 17/3267 463/30 |
| 2010/0075737 | A1 | 3/2010 | Bluemel | |
| 2010/0167815 | A1 | 7/2010 | Gagner et al. | |
| 2010/0234092 | A1 | 9/2010 | Gomez et al. | |
| 2010/0304832 | A1 | 12/2010 | Kup-Ferroth | |
| 2011/0111836 | A1* | 5/2011 | Acres | G07F 17/32 463/43 |
| 2011/0130199 | A1* | 6/2011 | Bailey | G07F 17/3272 463/46 |
| 2012/0122532 | A1 | 5/2012 | Berman et al. | |
| 2012/0178517 | A1 | 7/2012 | Montenegro et al. | |
| 2013/0310175 | A1* | 11/2013 | Fujisawa | G07F 17/3267 463/31 |
| 2014/0014186 | A1 | 1/2014 | Bhattacharya et al. | |
| 2014/0141860 | A1 | 5/2014 | Meyer | |
| 2014/0179396 | A1 | 6/2014 | Aoki et al. | |
| 2014/0274292 | A1 | 9/2014 | Suda | |
| 2014/0323198 | A1 | 10/2014 | Tuck | |
| 2015/0170462 | A1 | 6/2015 | Berman et al. | |
| 2015/0269809 | A1 | 9/2015 | Smith | |
| 2015/0287269 | A1 | 10/2015 | Berman | |
| 2015/0356833 | A1 | 12/2015 | Aoki et al. | |
| 2016/0042597 | A1 | 2/2016 | Olive | |
| 2017/0154498 | A1 | 6/2017 | Olive | |
| 2018/0268655 | A1 | 9/2018 | Olive | |
| 2018/0268659 | A1 | 9/2018 | Chesworth et al. | |
| 2018/0293846 | A1* | 10/2018 | Penacho | G07F 17/3267 |
| 2023/0144671 | A1* | 5/2023 | Penacho | G07F 17/3246 463/20 |

FOREIGN PATENT DOCUMENTS

| | | |
|---|---|---|
| GB | 2144568 B | 9/1985 |
| GB | 2251112 A | 6/1992 |

OTHER PUBLICATIONS

TheBigPayback, “Big Win! Gold of Tenochtitlan Slot—Very Cool Bonus!,” YouTube.com, < https://www.youtube.com/watch?v=Jf6tbzbrFjA&t=245s>, accessed Jul. 28, 2022.

Joshua O’Connell, “Treasure Box Kingdom: IGT Game Offers a Key to Victory,” KnowYourSlots.com, < https://www.knowyourslots.com/treasure-box-kingdom-igt-game-offers-a-key-to-victory/ >, accessed Jul. 28, 2022.

* cited by examiner

GAMING MACHINE WITH HIERARCHICAL COLLECTOR FEATURE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, SG Gaming, Inc.

FIELD

The present disclosure relates to a technological improvement to gaming systems, gaming machines, and methods thereon and, more particularly, to new and improved animations in connection with a bonus game feature.

BACKGROUND

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY

According to an embodiment of the present disclosure, there is provided a gaming system, gaming machine, and method that utilizes a presentation assembly configured to present a plurality of reels. The plurality of reels bear a plurality of symbols including value-bearing symbols and at least two special symbols. The at least two special symbols comprise at least a first special symbol and a second special symbol. The plurality of symbols are ranked according to a hierarchy. The value-bearing symbols have a lowest rank in the hierarchy. The at least two special symbols have ranks higher than the lowest rank. Each of the at least two special symbols has a different rank from each other within the hierarchy. Furthermore, each one of the at least two special symbols is configured to collect symbols of a lesser rank than its own rank. Game-logic circuitry conducts a series of spins of the plurality of reels, each spin including spinning and stopping the plurality of reels to randomly land at least some of the plurality of symbols in the array. A first one of the series of spins lands, via the game-logic circuitry, a set of the value-bearing symbols. In response to a second one the series of spins landing the first special symbol, collecting, via automated animation by the game-logic circuitry, the set of the value-bearing symbols into the first special symbol.

Additional aspects of the disclosure will be apparent to those of ordinary skill in the art in view of the detailed description of various embodiments, which is made with reference to the drawings, a brief description of which is provided below.

Figure 1:
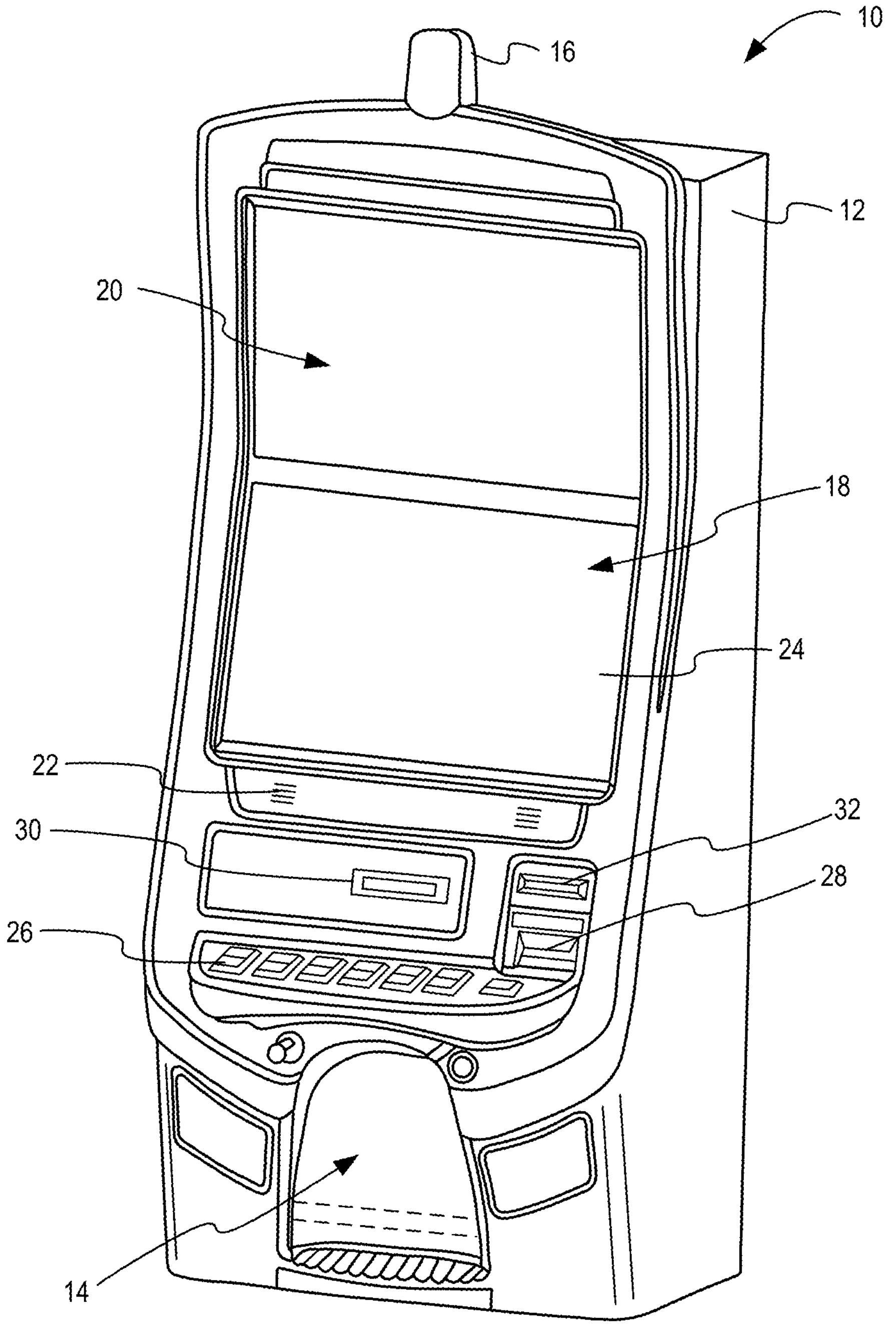
FIG. 1 is a perspective view of a free-standing gaming machine according to an embodiment of the present disclosure.

While the disclosure is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this disclosure is susceptible of embodiment in many different forms, there is shown in the drawings and will herein be described in detail preferred embodiments of the disclosure with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present disclosure, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical-reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 200 (see FIGS. 4-7). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on a "credits" meter (e.g., credit meter 200, see FIGS. 4-16), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
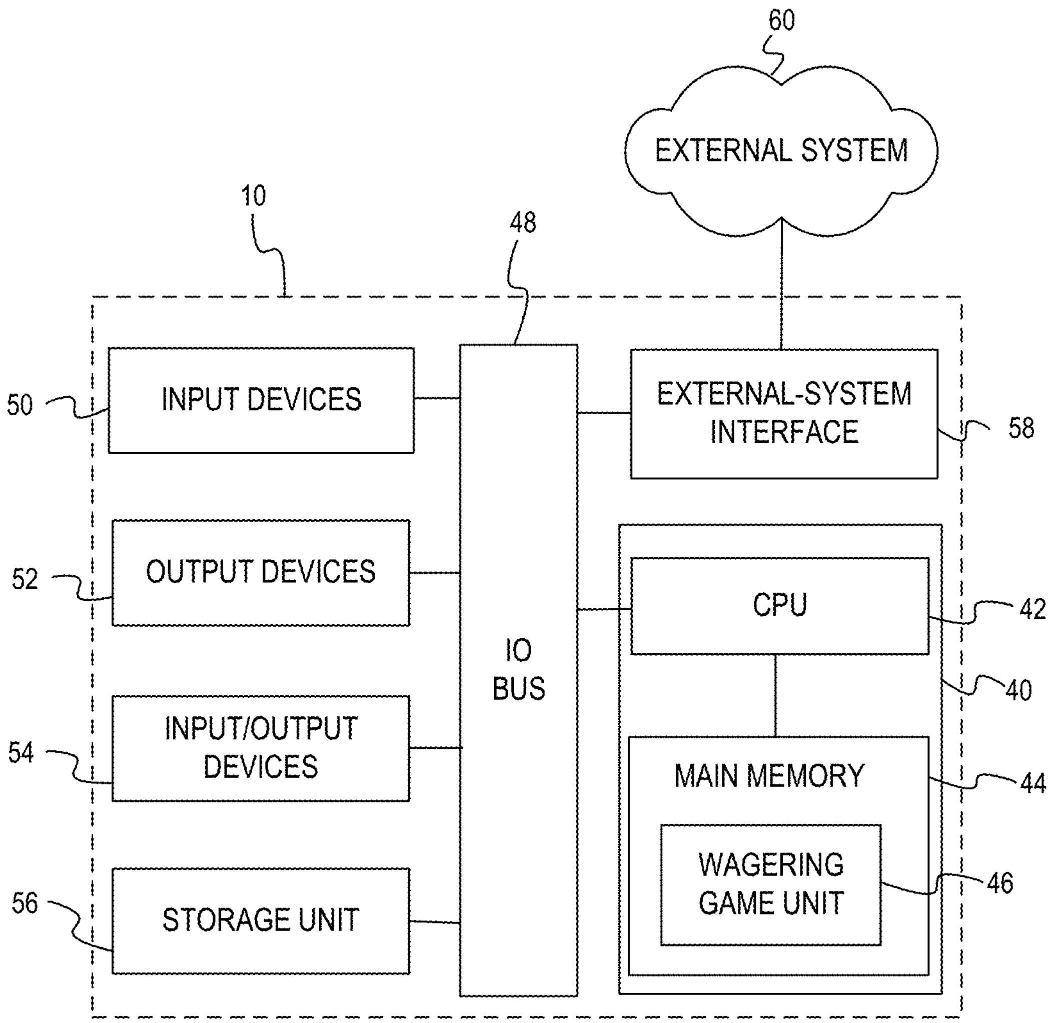
FIG. 2 is a block diagram of a gaming system according to an embodiment of the present disclosure.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)— all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry 40 facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be implemented with hardware and software architectures, circuitry, and other special features that differentiate it from general-purpose computers (e.g., desktop PCs, laptops, and tablets).

Figure 3:
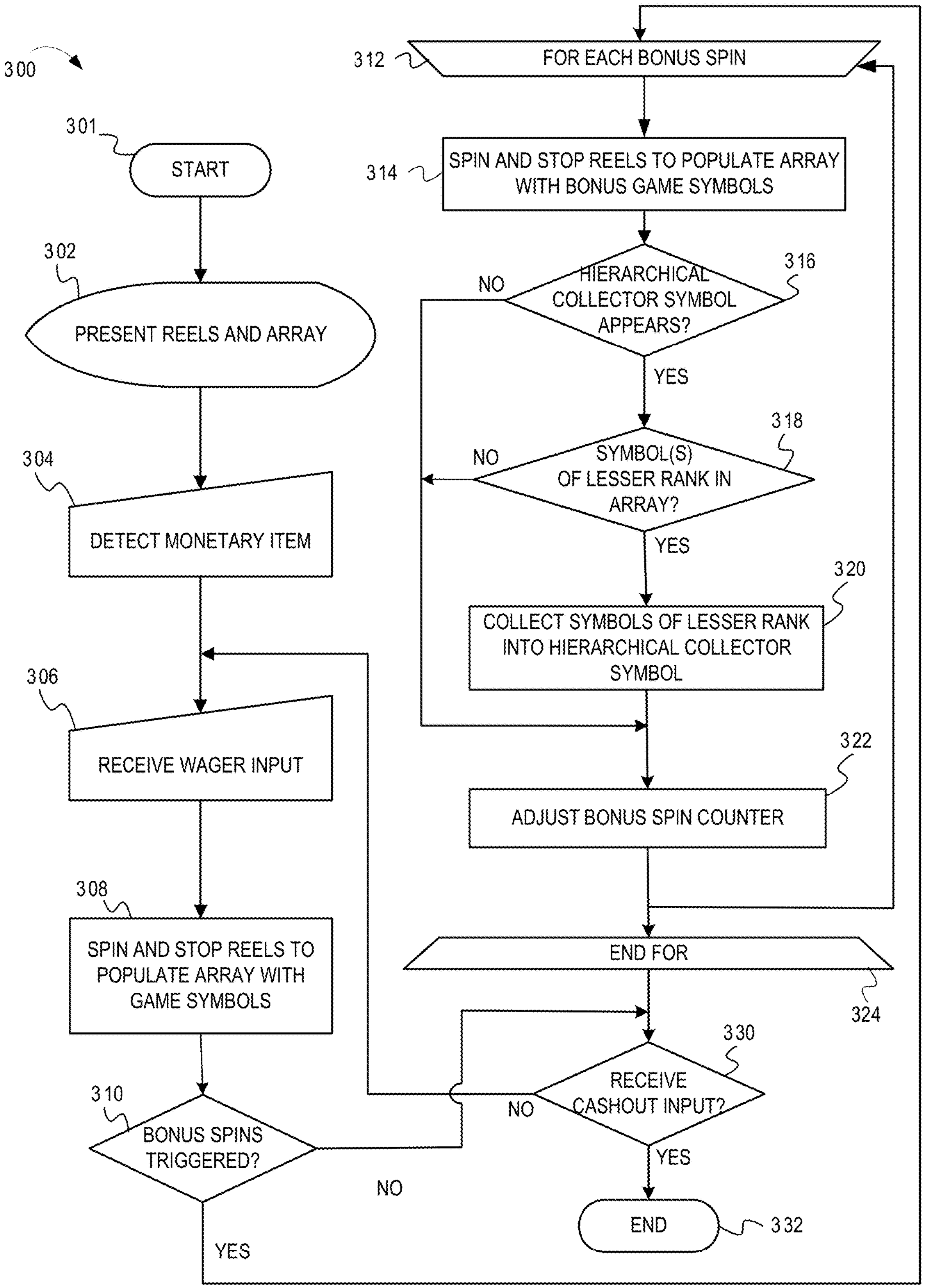
FIG. 3 is a flow diagram for a data processing method that corresponds to instructions executed by a controller, according to an embodiment of the present disclosure.

Referring now to FIG. 3, there is shown a flowchart representing one data processing method corresponding to at least some instructions stored and executed by the game-logic circuitry 40 in FIG. 2 to perform operations according to an embodiment of the present disclosure. The data processing method is described below in connection with an exemplary representation of a series of bonus game cycles (including spinning of the reels and a presentation of the spin outcomes) in FIGS. 4-16

The data processing method follows a flow 300, which commences at processing block 301. At processing block 302, game-logic circuitry controls one or more presentation devices (e.g., mechanical-reel display device, video display device, or a combination thereof) that presents a plurality of symbol-bearing reels and an array of symbol positions. Although the method is described with respect to one presentation device, it is to be understood that the presentation described herein may be performed by a presentation assembly including more than one presentation device. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. The number of symbol positions in different rows and/or different columns may vary from each other. The reels may be associated with the respective columns of the array such that the reels spin vertically and each reel populates a respective column. In another embodiment, the reels may be associated with the respective rows of the array such that the reels spin horizontally and each reel populates a respective row. In yet another embodiment, the reels may be associated with respective individual symbol positions of the array such that each reel populates only its respective symbol position.

In the example shown in FIGS. 4-16, the presentation device (e.g., display(s) 400) presents a three-by-five array 230 comprising three rows 220, 222, 224 and five columns 210, 212, 214, 216, 218. Each column is associated with a respective reel such that the reel populates the three symbol positions in the associated column. The reels bear a plurality of symbols. In one embodiment, the plurality of symbols include standard symbols (e.g., A, B, C, D, E, and F and value-bearing symbols 233). The standard symbols are used during base-game spins. Each value-bearing symbol 233 is associated with a credit or currency value indicated on the symbol itself. The value on a particular one the value-bearing symbols 233 may be fixed or variable (e.g., random) from one game cycle to the next. Different value-bearing symbols 233 on the reels may have different values. Each reel may contain one or more stacks (i.e., clumps) of value-bearing symbols 233 that appear adjacent to each other along the reel. The values of the value-bearing symbols 233 in any given stack may be the same or different. A stack of value-bearing symbols 233 may consist of two, three, four, or more adjacent symbols 233. In some embodiments, the value-bearing symbols 233 may appear only on specific portions of the array 230, such as only on certain cells of the array (e.g., on any empty cell except for a designated catalyst or "trigger" cell 502, see FIG. 5).

Returning to FIG. 3, at processing block 304, the game-logic circuitry detects, via a value input device, a physical item associated with a monetary value that establishes a credit balance. As shown in FIGS. 4-16, the credit balance may be shown on a credit meter 200 of the gaming machine.

At processing block 306, the game-logic circuitry initiates a wagering game cycle in response to an input indicative of a wager covered by the credit balance. To initiate a spin of the reels, the player may press a "Spin" or "Max Bet" key on a button panel or touch screen. As shown in FIGS. 4-16, the wager may be shown on a bet meter 202.

At processing block 308, using an RNG, the game-logic circuitry spins and stops the reels to randomly land standard symbols from the reels in the array 230 in visual association with one or more paylines (also known as lines, ways, patterns, or arrangements). The reel spin may be animated on a video display by depicting symbol-bearing strips moving vertically across the display and synchronously updating the symbols visible on each strip as the strip moves across the display.

Figure 4:
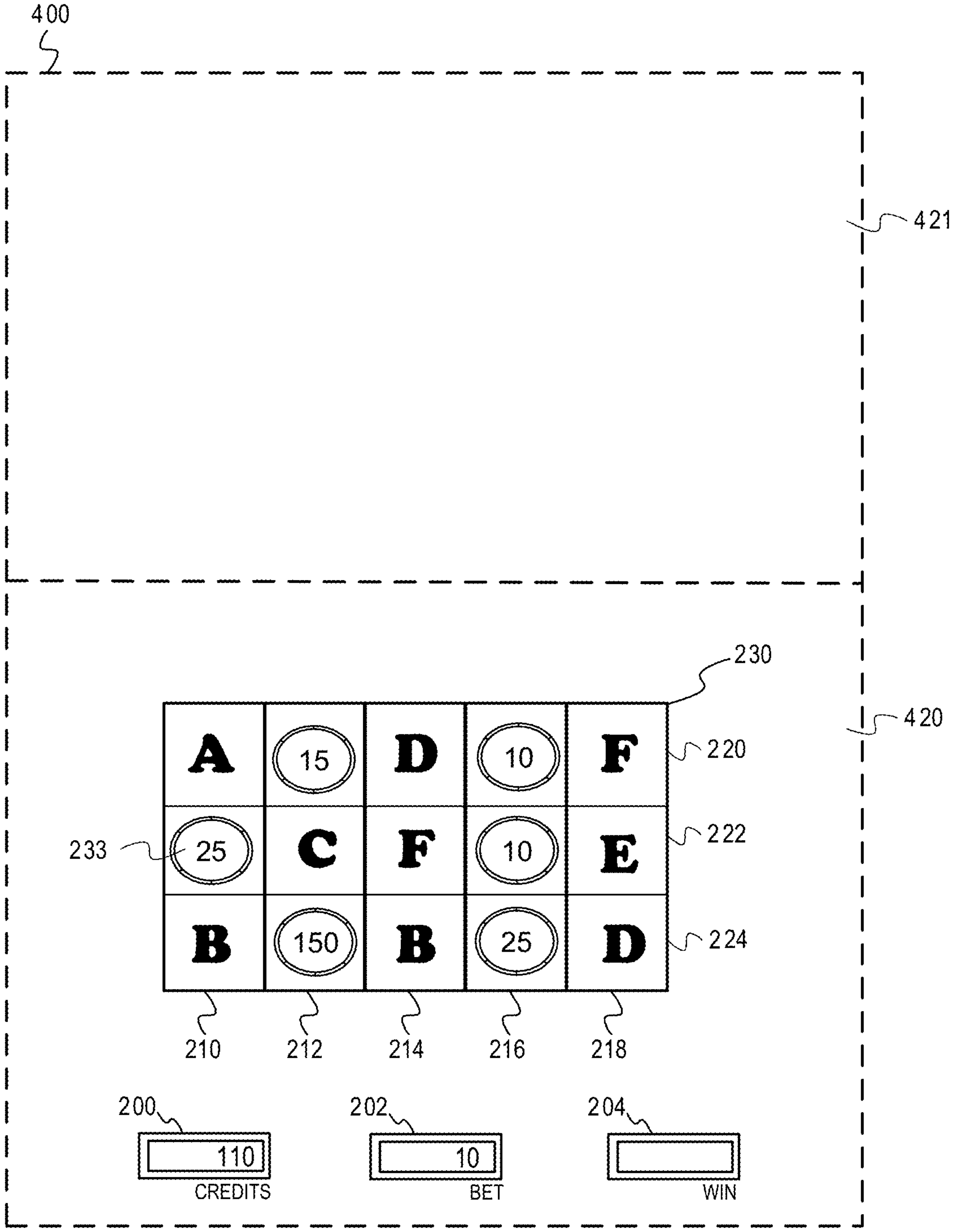
FIGS. 4-16 is an exemplary representation of a series of game cycle events and/or outcomes (i.e., spin outcomes) according to an embodiment of the present disclosure.

At processing block 310, the game-logic circuitry determines whether a series of bonus spins (also referred to as bonus games) are triggered. For example, the game-logic circuitry can determine whether or not the series of bonus spins are triggered by determining whether or not the array 230 contains one or more catalyst symbol(s). In one embodiment, the catalyst symbol(s) may be a special type of symbol, different from other standard symbols (e.g., a star symbol), which either lands in the array in the current game cycle or is carried over from a prior game cycle. In another embodiment, the catalyst symbol(s) include a group of at least some of standard symbols. For example, the catalyst symbol(s) can be a certain number of the value-bearing symbols 233. Referring to FIG. 4, in one embodiment, the bonus spins are triggered when a certain number of the value-bearing symbols 233 randomly appear within the array 230. In some embodiments, one or more of the value-bearing symbols 233 can accumulate within the array 230 over a series of base-game spins before the bonus spins are triggered. As soon as a certain number of the value-bearing symbols 233 appear within the array 230, the game-logic circuitry triggers the bonus spins.

Referring back to FIG. 3, if, at processing block 310, bonus spins are not triggered, the game-logic circuitry immediately proceeds to processing block 330. If, however, the bonus spins are triggered, the game-logic circuitry proceeds to processing block 312 where a loop begins. Each instance of the loop occur for each bonus spin. The loop includes the processing blocks 314 through 322. The loop begins with a first of the bonus spins. A bonus spin counter (e.g., bonus spin counter 540) tracks the instances of the loop. For example, at the beginning of the series of bonus spins the game-logic circuitry increments the bonus spin counter by one for each one of the value-bearing symbols that appeared (at processing block 310). Thereafter, the game-logic circuitry decrements the bonus spin counter after each spin (e.g., after completion of each instance of the loop) and, in some instances, the game-logic circuitry increments the bonus spin counter (e.g., adds bonus spins) based on events that occur within the loop (e.g., based on whether or not a special "hierarchical collector" symbol appears during the bonus spin—see processing block 322)). The loop ends after the last bonus spin completes (e.g., when the bonus spin counter reaches zero).

FIGS. 4-16 depict exemplary representations of some of the bonus spins. Each figure represents a different stage of at least one of the series of bonus spins. In the description of each of FIGS. 4-16, reference is made to certain applicable processing blocks from FIG. 3.

Figure 5:
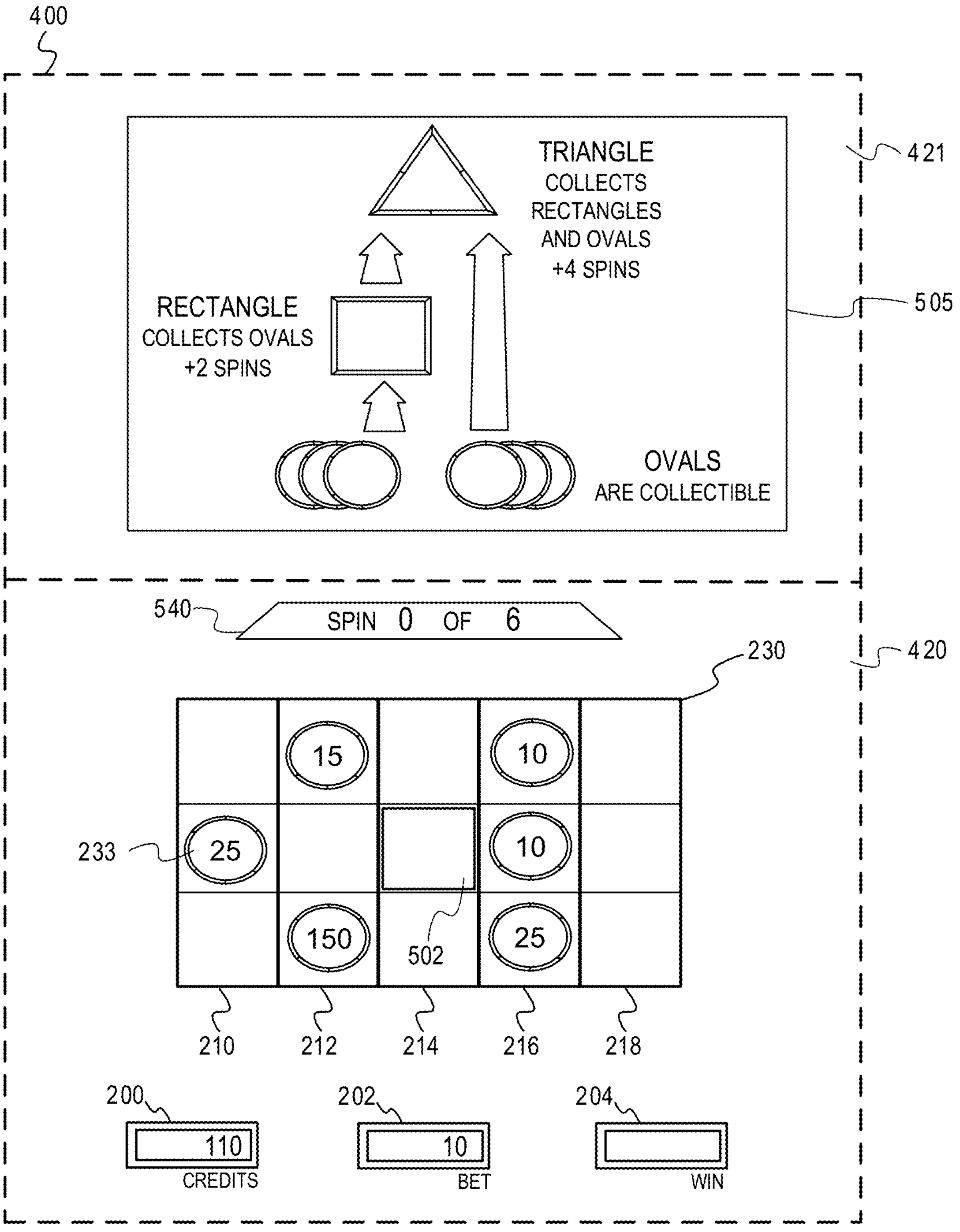

FIGS. 4-5 illustrate different game states prior to a first spin of the series of bonus spins.

Referring to FIG. 4 a first game state occurs after the bonus spins are triggered (e.g., processing block 310). As shown, the array 230 includes a required number of the value-bearing symbols 233 to trigger the bonus spins.

Referring to FIG. 5, a second game state occurs before the first bonus spin. In the second game state, the game-logic circuitry prepares the game array 230 for bonus game play. For example, the game-logic circuitry removes certain ones of the standard symbols from the array 230. For instance, the game-logic circuitry removes from the array 230 base-game symbols that are not value-bearing symbols (e.g., symbols A, B, C, D, E and/or F) leaving only the value-bearing symbols 233. Each of the value-bearing symbols 233 that appeared (at processing block 310) remains in its position within the array 230. As shown, in some embodiments, the value-bearing symbols 233 are used as standard symbols in the base game (e.g., for a base-game mechanic that uses value-bearing symbols) as well as bonus game symbols (e.g., for hierarchical collection).

In one embodiment, the bonus spins are presented using one or more display(s) (display(s) 400). For example, the display(s) 400 includes a primary display 420 and a secondary display 421. The primary display 420 is designated for the presentation of bonus spin outcomes. The secondary display 421 is designated for presenting other parts of the bonus-game mechanic, such as to present information about, and/or animations of, a hierarchy or a collection event. For example, in FIG. 5, the secondary display area 421 presents a description 505 of a "collection" hierarchy used in the bonus game mechanic for the bonus spins. The description 505 explains that bonus game symbols are ranked according to the hierarchy. For example, each of the game symbols is assigned a given rank within the hierarchy. For instance, a first type of symbol (i.e., the oval-shaped, value-bearing symbols 233) have a lowest rank in the hierarchy. They are collectible symbols. In other words, the value-bearing symbols 233 (i.e., the oval-shaped symbols having the lowest rank) do not collect other symbols. Rather, they are collected by other types of special symbols ("collector" symbols) having a higher rank within the hierarchy. The description 505 also explains that special bonus-game symbols (i.e. the collector symbols) are included in the hierarchy. By way of example, the first of the special symbol types is a rectangular-shaped symbol, and the second of the special symbol types is a triangular-shaped symbol. The rectangular-shaped symbol may be referred to herein as a first hierarchical collector symbol in that it the first of the collector-type symbols within the hierarchy (i.e., the first of collector symbols). The first hierarchical collector symbol has a second rank within the hierarchy. The second rank is higher than the first rank. The first hierarchical collector symbol is configured to collect symbols of a lesser rank than its own rank (i.e., any rectangular-shaped symbol is configured to collect only the oval-shaped symbols). The triangular-shaped symbol may be referred to herein as a second hierarchical collector symbol in that it the second of the collector-type symbols within the hierarchy (i.e., the second of collector symbols). The second hierarchical collector symbol has a third rank within the hierarchy. The third rank is higher than both the first rank and the second rank. The second hierarchical collector symbol is configured to collect symbols of a lesser rank than its own rank (i.e., any triangular-shaped symbol is configured to collect any rectangular-shaped symbol as well as any oval-shaped symbol). In some embodiments, the second hierarchical collector symbol does not collect other symbols of its same rank.

A central cell (trigger cell 502) is designated as a cell in which either the first hierarchical collector symbol or the second hierarchical collector symbol can randomly appear during any one of the bonus spins (e.g., at processing block 314).

Figure 6:
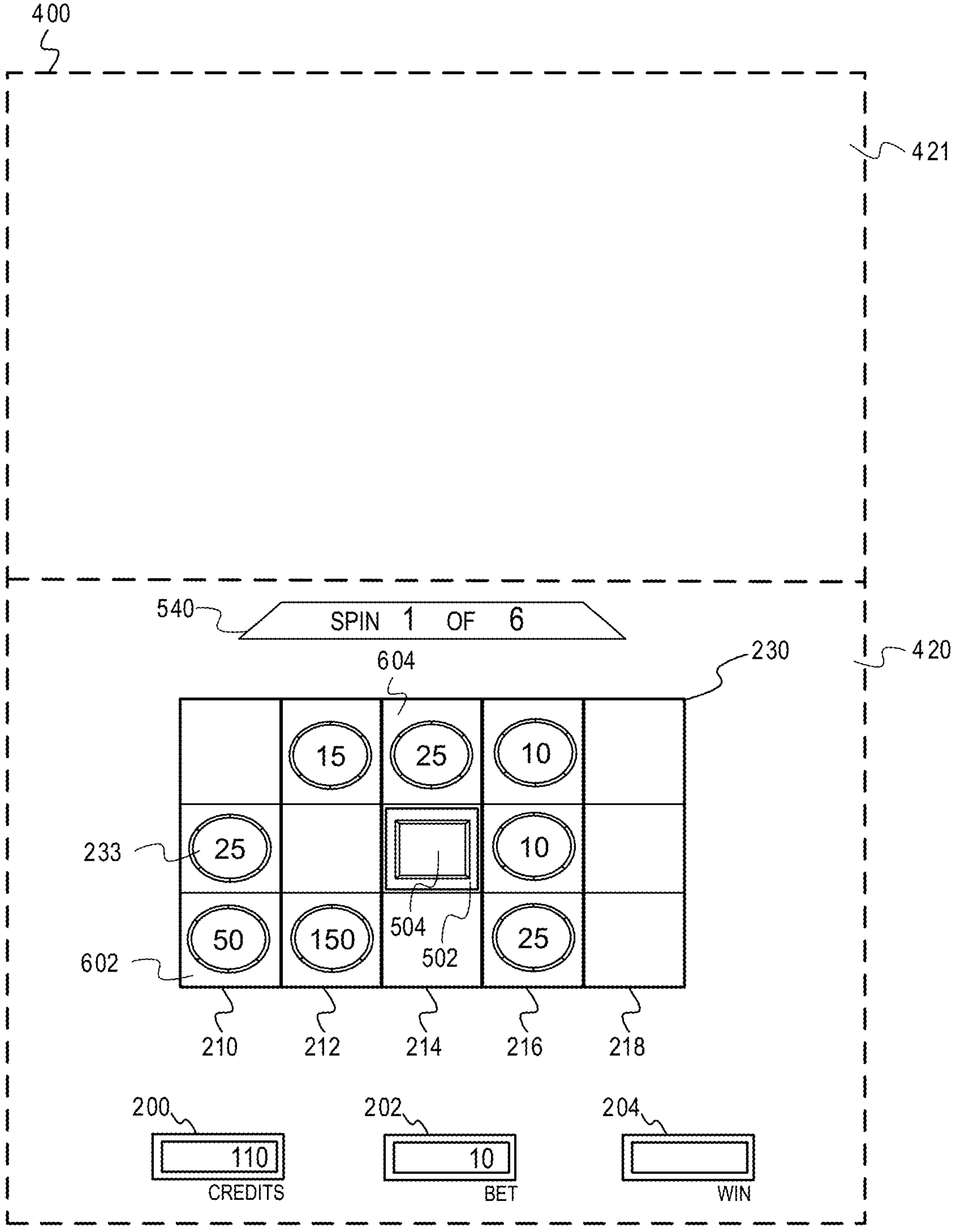
Figure 7:
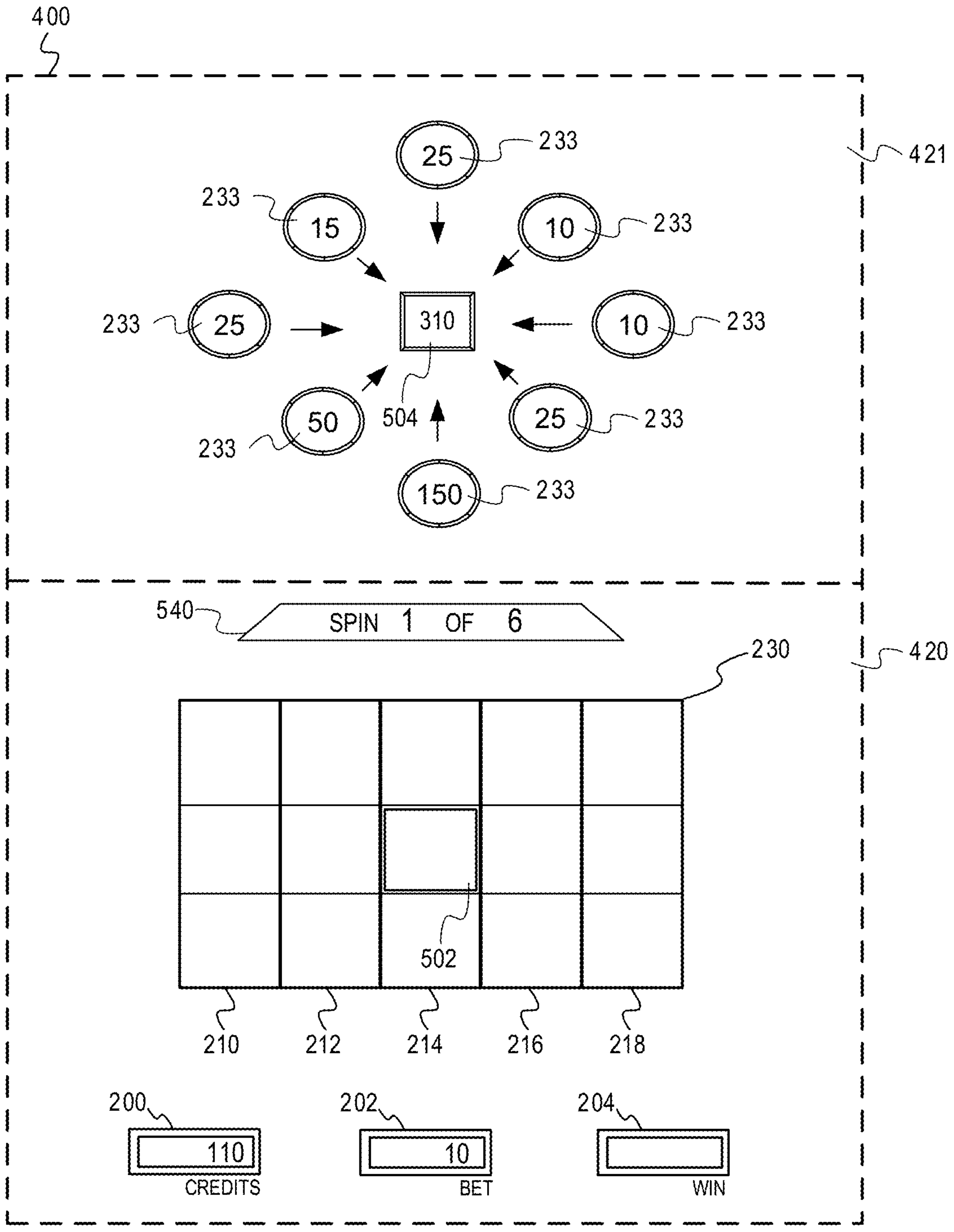
Figure 8:
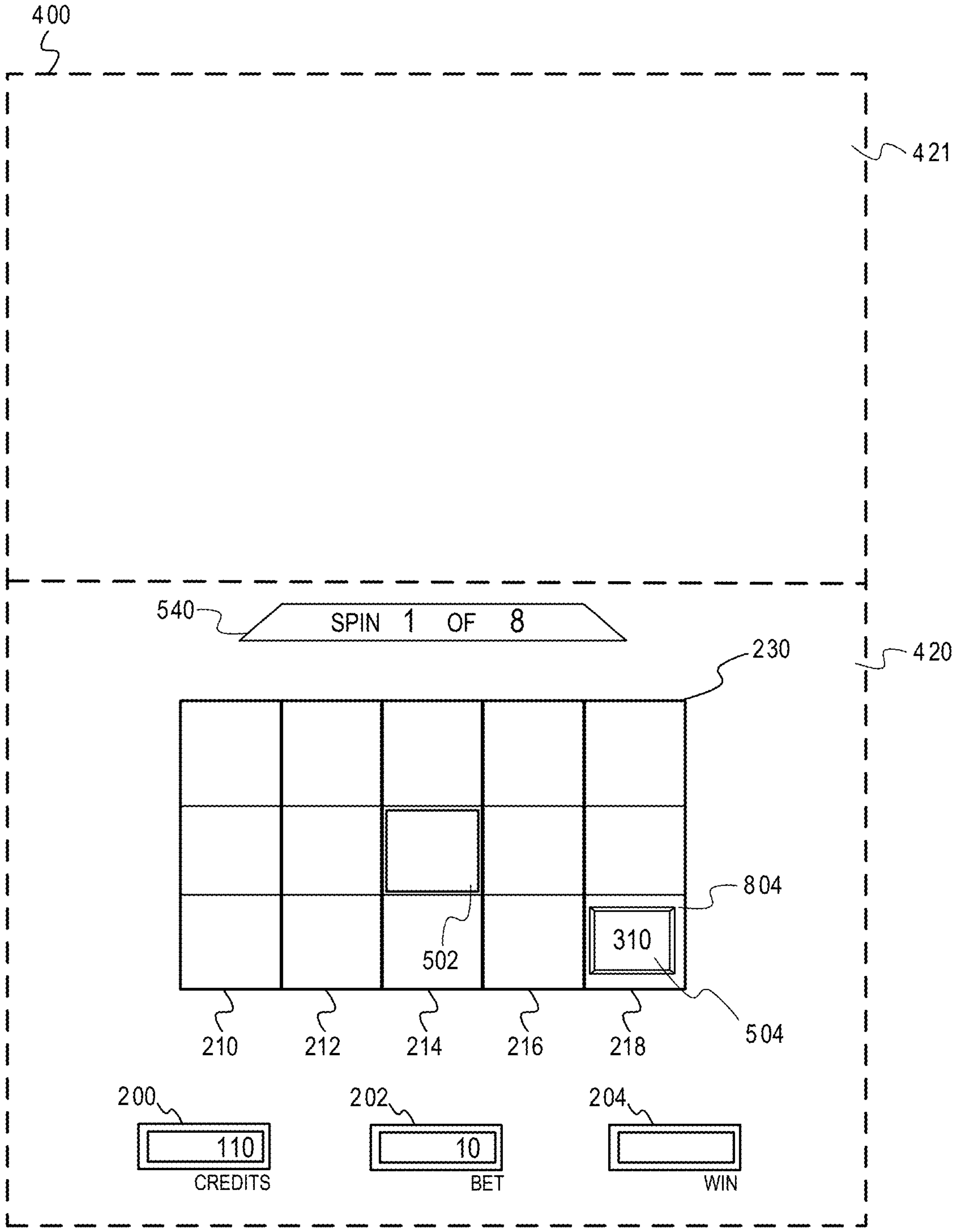

FIGS. 6-8 illustrate different stages of a first spin of the series of bonus spins.

Referring to FIG. 6, at a first stage of the first spin, the game-logic circuitry spins and stops the reels to populate the array with bonus game symbols (e.g., processing block 314). For example, in FIG. 6, the reels associated with columns 210, 212, 214, 215, and 218 randomly spin (while persisting the value-bearing symbols 233 in their positions within the array 230). During the first spin, additional value-bearing symbols appear (e.g., additional ones of the value-bearing symbols 233 randomly appear in empty slots (i.e., unoccupied cells) of the array other than the trigger cell 502 (e.g., in cells 602 and 604)). Furthermore, a collector symbol 504 appears in the trigger cell 502. The collector symbol 504 is the rectangular-shaped collector symbol, or rather the type of collector symbol assigned to the second rank in the hierarchy (i.e., also referred to herein as the first hierarchical collector symbol). In one embodiment, only one collector symbol can appear for any given bonus spin. In the example shown in FIG. 6, the trigger cell 502 appears within the array 230, such as in a designated, center cell. However, in other embodiments, a collector symbol can appear in other sections of the array 230 and/or in a section outside of the array 230.

Referring to FIG. 7 and FIG. 8, at a second stage of the first spin, the game-logic circuitry conducts a collection event. For instance, the game-logic circuitry determines whether a hierarchical collector symbol appears in the array 230 (e.g., processing block 316). If the game-logic circuitry determines that a hierarchical symbol appears, then the game-logic circuitry determines whether there are symbols of lesser rank within the array 230 to collect (e.g., processing block 318). If there are symbols of lesser rank within the array, then the game-logic circuitry collects (e.g., via an automated animation, via manipulation of presentation assembly elements, etc., the symbols of lesser rank into the hierarchical collector symbol (e.g., processing block 320). In one embodiment, collecting symbols of lesser rank includes (1) adding credit values of a collected set of symbols of lesser rank to the credit value of the hierarchical collector symbol, (2) removing the set of collected symbol(s) from the array, and (3) positioning the hierarchical collector symbol into a cell of the array designated for value-bearing symbols (e.g., removing the hierarchical collector symbol from the trigger cell and placing it in a separate unoccupied cell of the array designated for collectible symbols). After the collector symbol is re-positioned into the array, then the collector symbol is treated thereafter as a value-bearing symbol. Once re-positioned, the collector symbol does not possess collection capabilities (i.e., it only collects upon its first appearance in the trigger cell 502, thereafter is treated solely as a collectible value-bearing symbol within the array 230). However, the collector symbol retains its same rank so that it can only be subject to subsequent collection by a different hierarchical collector symbol of a higher rank. In the example shown in FIG. 7, in response to the appearance of the collector symbol 504 in the trigger cell 502, the game-logic circuitry removes the oval-shaped symbols (i.e., the value-bearing symbols 233) from the array 230. For example, the game-logic circuitry moves the value-bearing symbols 233 to the secondary display 421. The game-logic circuitry then adds the credit values of the value-bearing symbols 233 to a credit value of the collector symbol 504 (e.g., the credit values add up to a total value of "310" credits). As shown in FIG. 8, the game-logic circuitry then positions the collector symbol 504 into a cell of the array 230 that is not the trigger cell 502, such as cell 804. The collector symbol 504 persists in the cell 804 either for a remainder of the series of bonus spins or until it is collected by a hierarchical collector symbol of a higher rank. As a result of the collection event, all of the cells in the array 230 that were occupied by value-bearing symbols 233 are freed up for the potential appearance of additional value-bearing symbols. The total value of the collected (and removed) value-bearing symbols 233 is retained in the credit value of the collector symbol 504.

In some embodiments, the value-bearing symbol may be tied to a progressive jackpot value. For instance, the value-bearing symbol may specify a "mini" or "major" jackpot identifier, however, in one embodiment, the actual credit value depends on the value of the jackpot at the time that the value-bearing symbol is collected into the collector symbol.

In some embodiments, collector symbols can be different types that pertain to different sections of an array. For example, different types of collector symbols can collect value-bearing symbols 233 from only specific sections of the array 230 (e.g., collect from only specific rows, columns, sections, etc.).

In addition to collecting the value-bearing symbols 233 into the collector symbol 504, the game-logic circuitry adjusts the bonus spin counter 540 (processing block 322). For example, the game-logic circuitry decrements the bonus spin counter 540 by one for the current spin and increments the bonus spin counter 540 by two for the appearance of the collector symbol 504.

Figure 9:
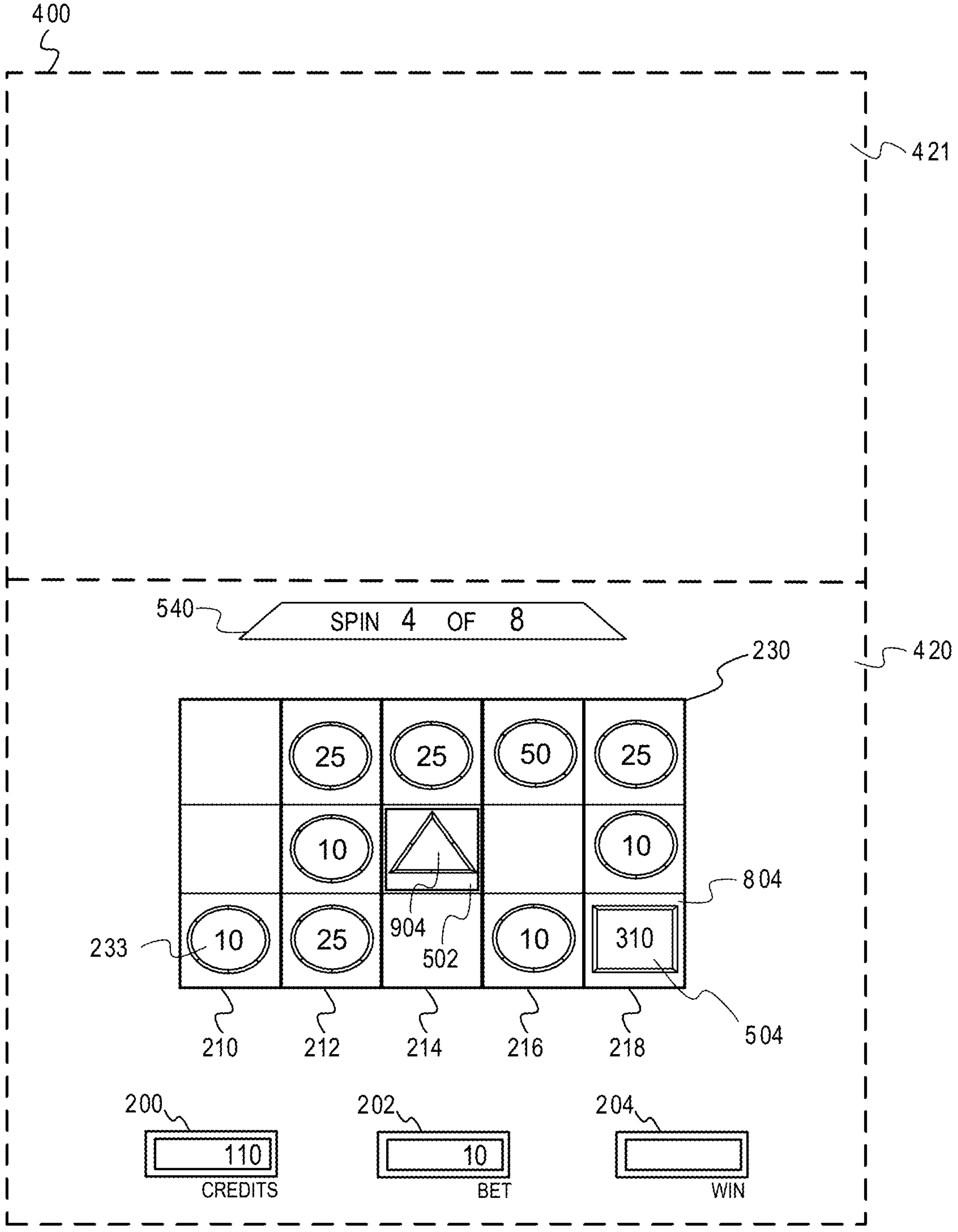
Figure 10:
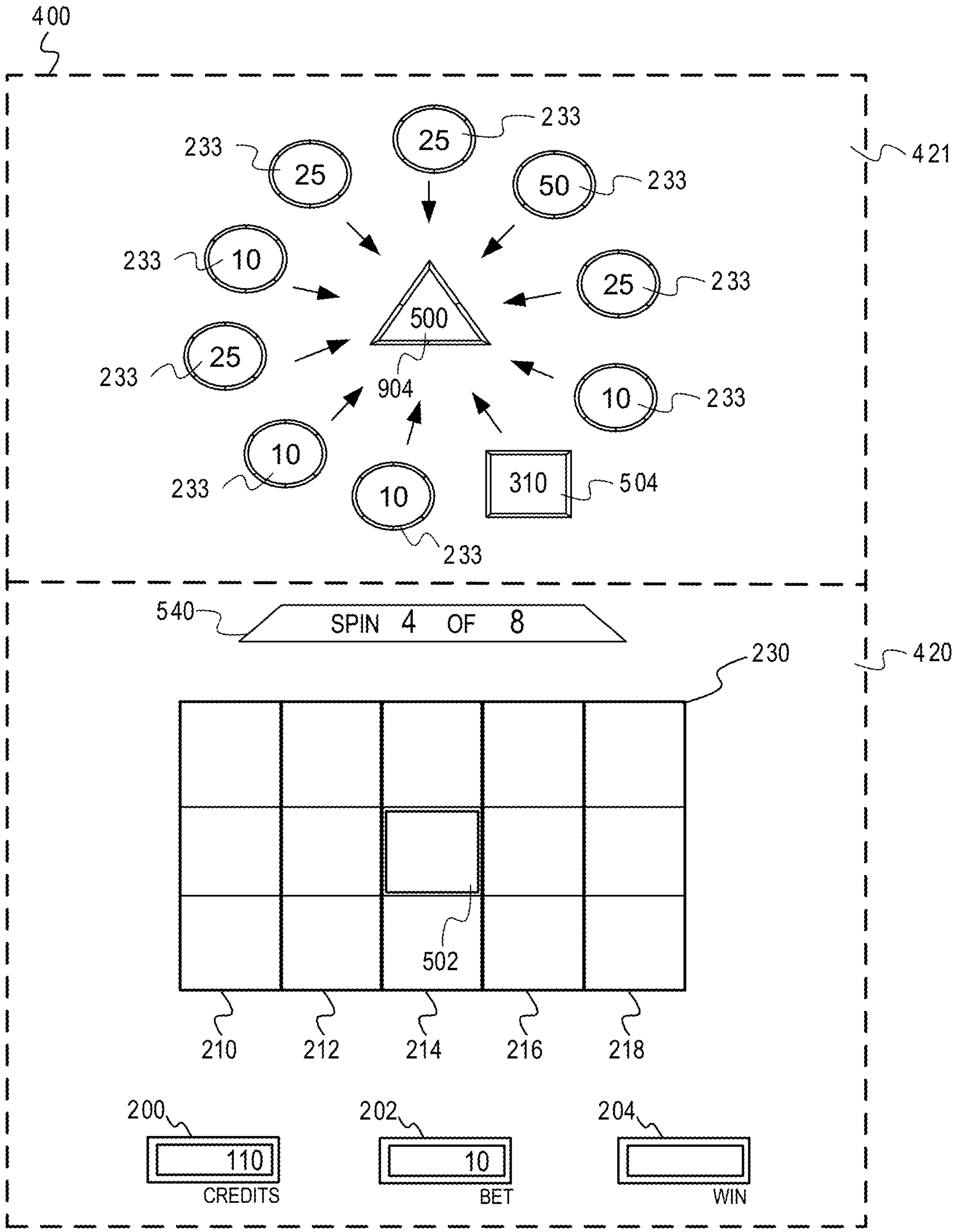
Figure 11:
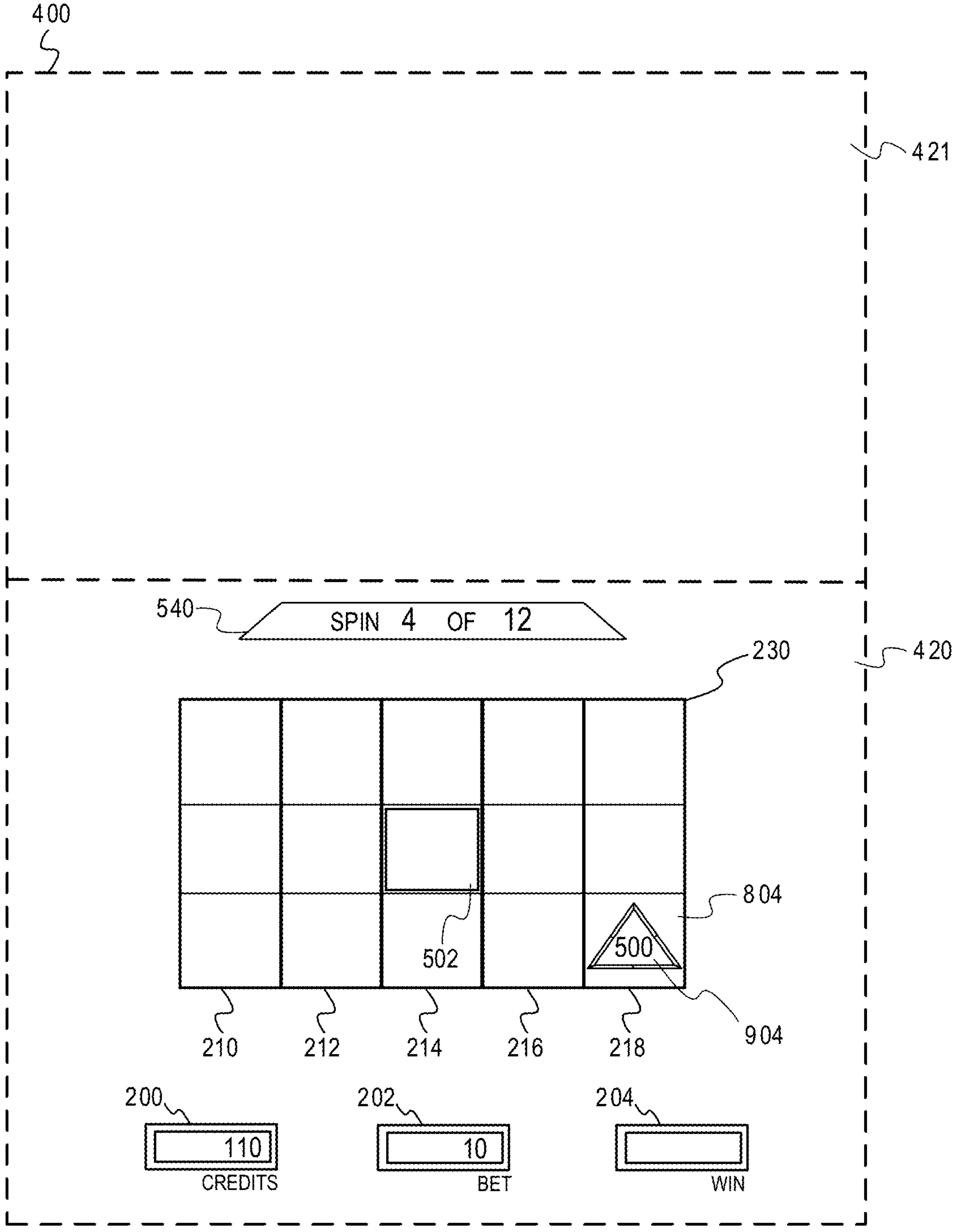

FIGS. 9-11 illustrate different stages of a fourth spin of the series of bonus spins.

Referring to FIG. 9, at a first stage of the fourth spin, the game-logic circuitry spins and stops the reels to populate the array 230 with bonus game symbols (e.g., processing block 314). For example, in FIG. 9, the reels associated with columns 210, 212, 214, 215, and 218 randomly spin (while persisting the collector symbol 504 within cell 804 of the array 230). During either the second, third and fourth spins, additional value-bearing symbols 233 appear (e.g., additional ones of the value-bearing symbols 233 randomly appear in unoccupied cells of the array 230 other than the trigger cell 502). In the second and third spins that occurred before the fourth spin, no additional collector symbols appeared. However, in the first stage of the fourth spin (as shown in FIG. 9), a collector symbol 904 appears in the trigger cell 502. The collector symbol 904 is a triangular-shaped of collector symbol, or rather a type of collector symbol assigned to the third rank in the hierarchy (i.e., also referred to herein as the second hierarchical collector symbol).

Referring to FIG. 10 and FIG. 11, at an additional stage of the fourth spin, the game-logic circuitry conducts a collection event. For example, the game-logic circuitry determines that a hierarchical collector symbol appears in the array 230 (e.g., processing block 316) and also determines that there are symbols of lesser rank within the array 230 to collect (e.g., processing block 318). In the example shown in FIG. 10, in response to the appearance of the collector symbol 904 in the trigger cell 502, the game-logic circuitry removes the oval-shaped symbols (i.e., the value-bearing symbols 233) from the array 230. Furthermore, because the collector symbol 504 is treated as a collectible value bearing symbol, and because its rank (second rank) is lower than the rank of the collector symbol 904 (third rank), then the game-logic circuitry also removes the collector symbol 504 from the array. The game-logic circuitry moves the value-bearing symbols 233 and the collector symbol 504 to the secondary display 421. The game-logic circuitry then adds the credit values of the value-bearing symbols 233 and the collector symbol 504 to a credit value of the collector symbol 904 (e.g., the credit values add up to a total value of "500" credits). As shown in FIG. 11, the game-logic circuitry then positions the collector symbol 904 into a cell of the array 230 that is not the trigger cell 502, such as cell 804. The collector symbol 904 persists in the cell 804 for a remainder of the series of bonus spins. In some embodiments (e.g., as described for FIGS. 4-16) the hierarchy includes three ranks. Because the collector symbol 904 possesses the highest rank in the hierarchy (i.e., the third rank), then it cannot be collected by any other collector symbol. However, it should be noted that other embodiments can utilize more than three ranks. For example, in some embodiments, more than two types of hierarchical collector symbols are used. For instance, in one embodiment a third hierarchical collector symbol (e.g., a cube-shaped collector symbol, has a fourth rank in the hierarchy and is configured to collect lower-ranked symbols, such as triangular-shaped collector symbols (third rank), rectangular-shaped collector symbols (second rank), and oval-shaped collector symbols (first rank)). Furthermore, as shown in FIGS. 4 through 16, one type of hierarchy is described (i.e., a linear or lock-step rank hierarchy, where the next highest rank outranks all lower ranks). However, in other embodiments, other types of hierarchies can be utilized, such as hierarchies where one collector symbol may covert rank in response to an event or where different combinations or subsets of a hierarchy are applied to different symbols. For example, a cube-shaped collector symbol could collect all ranks below it except one (e.g., a cube-shaped collector symbol could collect oval-shaped symbols and triangular-shaped collector symbols, but not rectangular-shaped collector symbols).

In addition to collecting the value-bearing symbols 233 and the collector symbol 504 into the collector symbol 904, the game-logic circuitry adjusts the bonus spin counter 540 (processing block 322). For example, the game-logic circuitry decrements the bonus spin counter 540 by one for the current spin and increments the bonus spin counter 540 by four for the appearance of the collector symbol 904.

Figure 12:
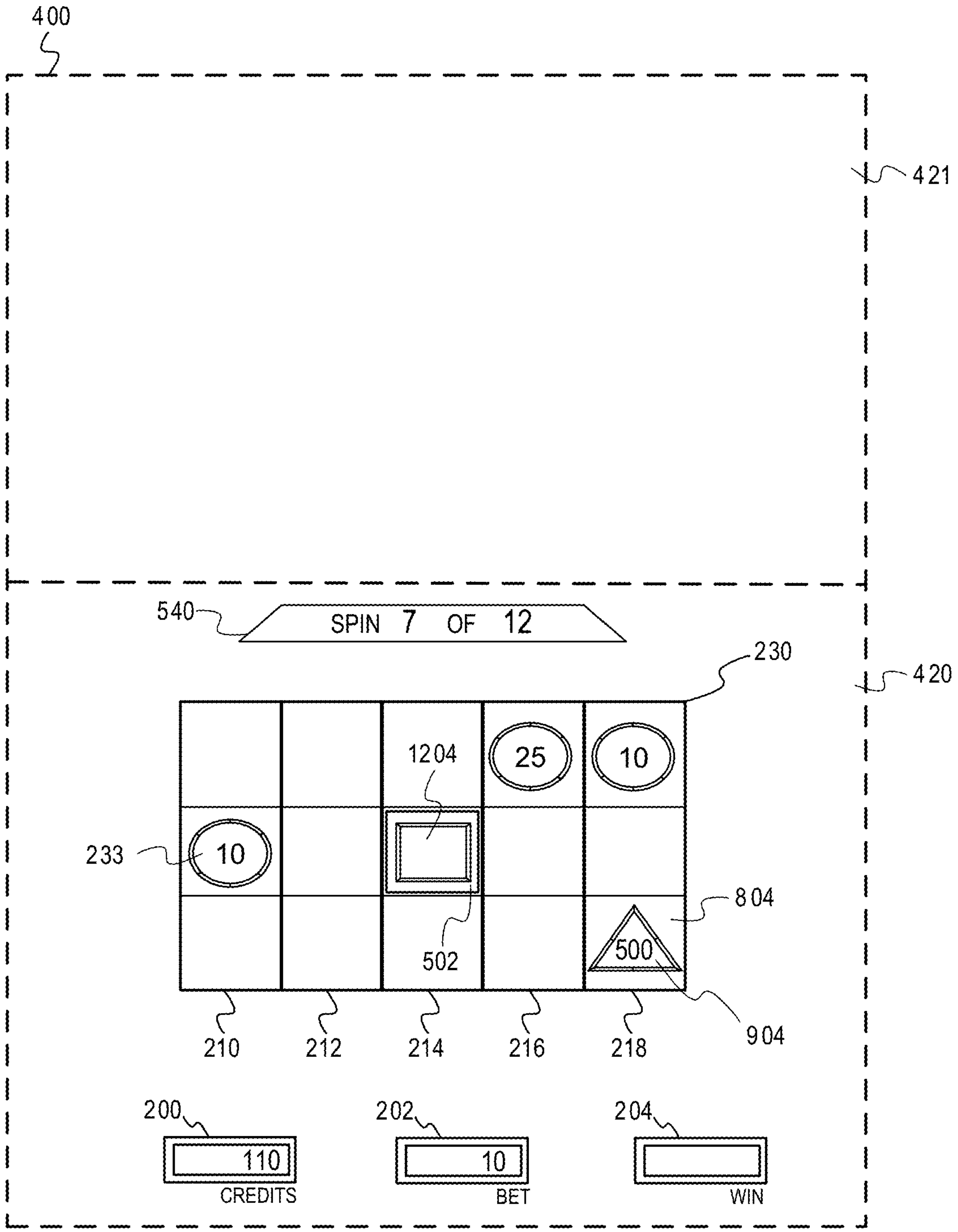
Figure 13:
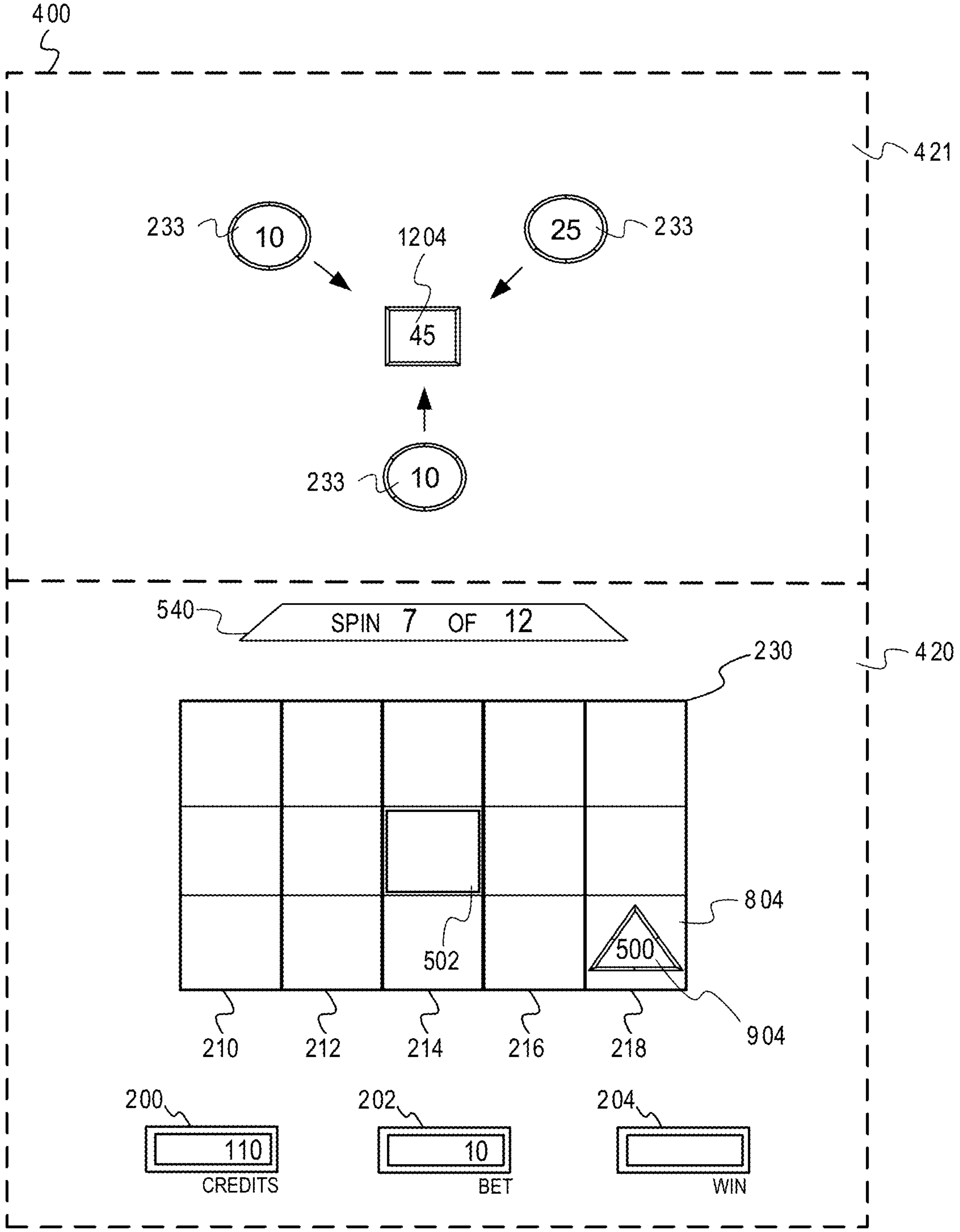
Figure 14:
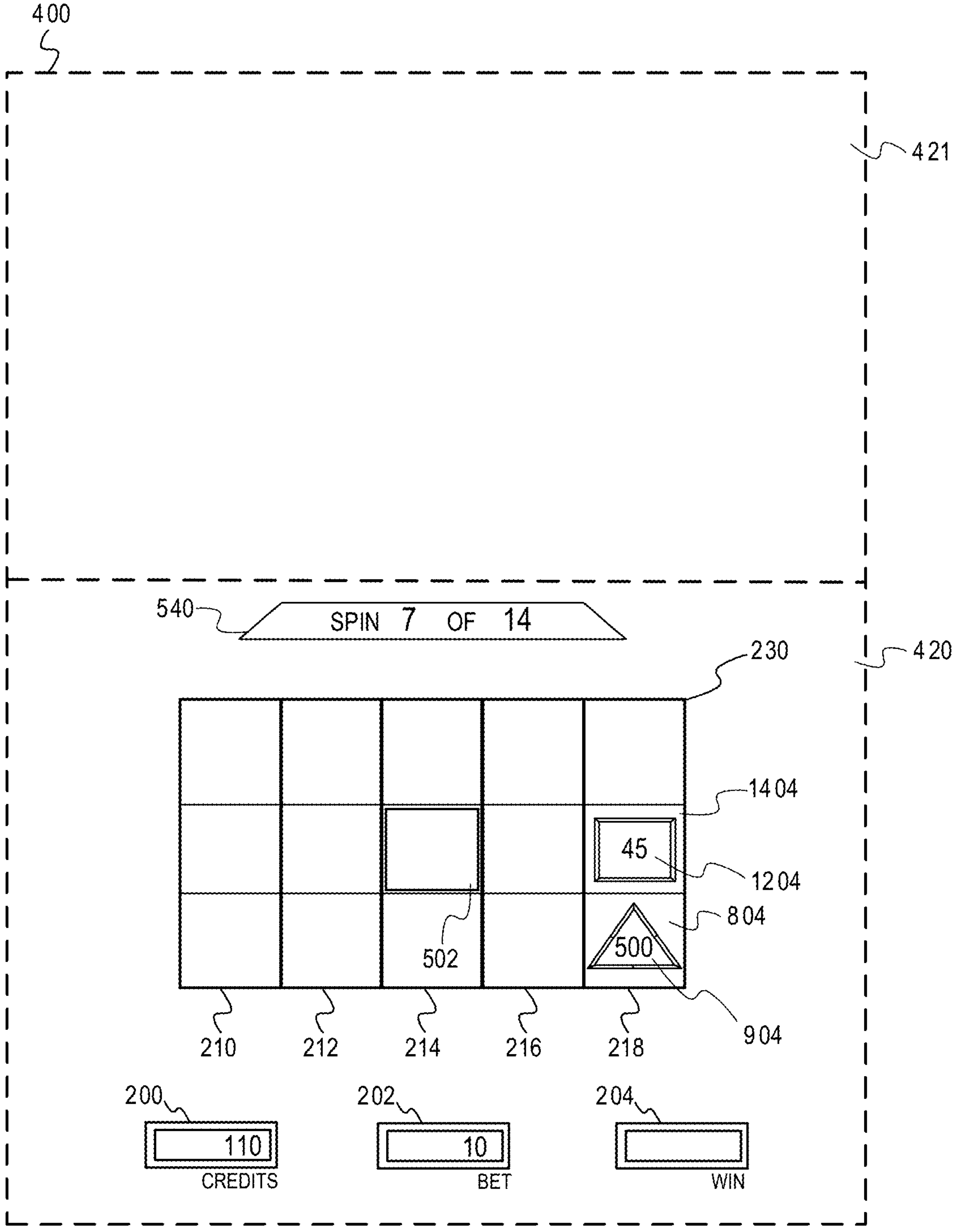

FIGS. 12-14 illustrate different stages of a seventh spin of the series of bonus spins.

Referring to FIG. 12, at a first stage of the seventh spin, the game-logic circuitry spins and stops the reels to populate the array 230 with bonus game symbols (e.g., processing block 314). For example, in FIG. 12, the reels associated with columns 210, 212, 214, 215, and 218 randomly spin (while persisting the collector symbol 904 within cell 804 of the array 230). During either the fifth, sixth and seventh spins, additional value-bearing symbols 233 appear (e.g., additional ones of the value-bearing symbols 233 randomly appear in unoccupied cells of the array 230 other than the trigger cell 502). In the fifth and sixth spins that occurred before the seventh spin, no additional collector symbols appeared. However, in the first stage of the seventh spin (as shown in FIG. 12), a collector symbol 1204 appears in the trigger cell 502. The collector symbol 1204 is a rectangular-shaped collector symbol (i.e., the first hierarchical collector symbol, which has the second rank in the hierarchy).

Referring to FIG. 13 and FIG. 14, at an additional stage of the seventh spin, the game-logic circuitry conducts a collection event. For example, the game-logic circuitry determines that a hierarchical collector symbol appears in the array 230 (e.g., processing block 316) and also determines that there are symbols of lesser rank within the array 230 (e.g., processing block 318). In the example shown in FIG. 13, the collector symbol 1204 is a rectangular-shaped type of collector symbol having the second rank. In response to the appearance of the collector symbol 1204 in the trigger cell 502, the game-logic circuitry removes the oval-shaped symbols (i.e., the value-bearing symbols 233) from the array 230. However, because the collector symbol 904 possesses the third rank (which is greater than the second rank possessed by the collector symbol 1204), then the collector symbol 904 remains in its position in cell 804. The game-logic circuitry moves the value-bearing symbols 233 and the collector symbol 1204 to the secondary display 421. The game-logic circuitry then adds the credit values of the value-bearing symbols 233 to a credit value of the collector symbol 1204 (e.g., the credit values add up to a total value of "45" credits). As shown in FIG. 14, the game-logic circuitry then positions the collector symbol 1204 into a cell of the array 230 that is not the trigger cell 502, such as cell 1404. The collector symbol 1204 persists in the cell 1404 either for a remainder of the series of bonus spins or until it is collected by a hierarchical collector symbol of a higher rank.

In addition to collecting the value-bearing symbols 233 into the collector symbol 1204, the game-logic circuitry adjusts the bonus spin counter 540 (processing block 322). For example, the game-logic circuitry decrements the bonus spin counter 540 by one for the current spin and increments the bonus spin counter 540 by two for the appearance of the collector symbol 1204.

Figure 15:
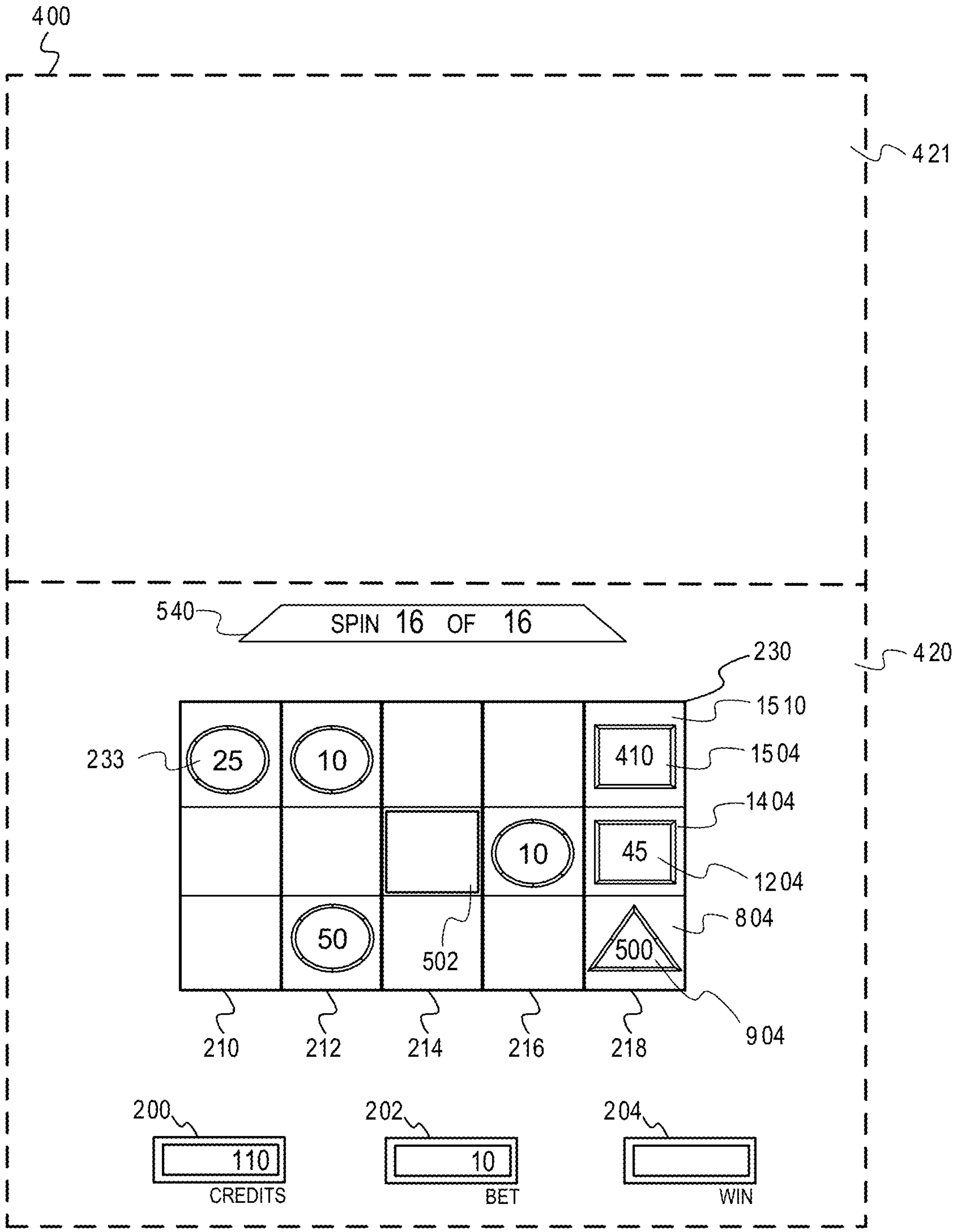
Figure 16:
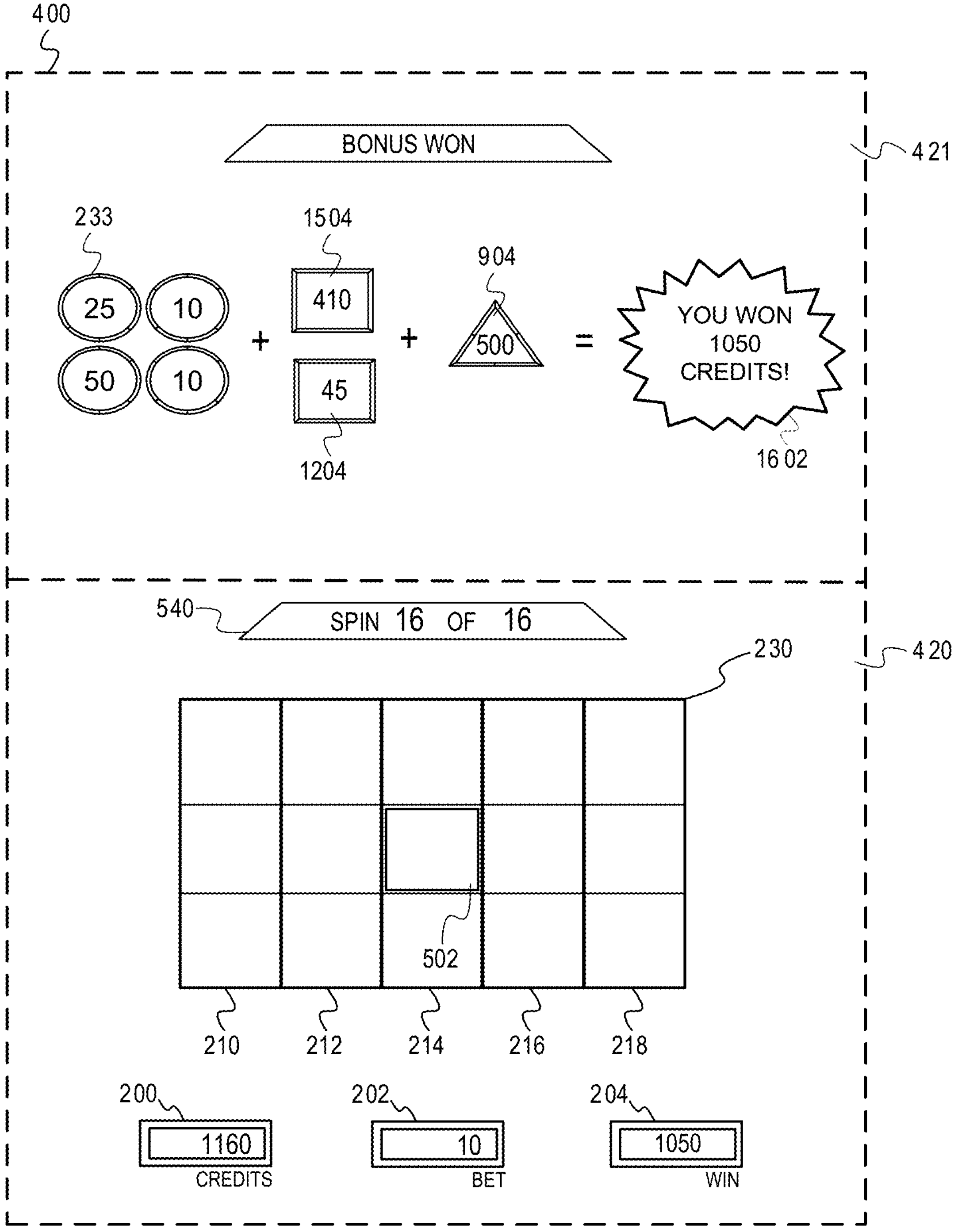

FIGS. 15-16 illustrate different stages of a final spin of the series of bonus spins.

Referring to FIG. 15, at a first stage of the final spin, the game-logic circuitry spins and stops the reels to populate the array 230 with bonus game symbols (e.g., processing block 314). For example, in FIG. 15, the reels associated with columns 210, 212, 214, 215, and 218 randomly spin (while persisting the collector symbol 904 within cell 804 and while persisting the collector symbol 1204 within cell 1404 of the array 230). During previous spins, additional value-bearing symbols 233 appeared (e.g., additional ones of the value-bearing symbols 233 randomly appeared in unoccupied cells of the array 230 other than the trigger cell 502. Furthermore, in the previous spins that occurred before the final spin, an additional collector symbol 1504 appeared, collected "410" credit values (from lower-ranked symbols in the array 230 at the time of the collection event), and was positioned into cell 1510. In the example shown in FIG. 15, no additional collector symbol appears in the trigger cell 502. If an additional collector symbol had appeared than an additional collection event would have been triggered.

Referring to FIG. 16, at an additional stage of the final spin, the game-logic circuitry conducts an award event. For example, the game-logic circuitry adds up all of the credit values of any symbols in the array 230 and awards the credit values to the credit meter 200. As shown in FIG. 16, the game-logic circuitry moves the value-bearing symbols 233, the collector symbol 1204, the collector symbol 1504, and the collector symbol 904 to the secondary display 421. The game-logic circuitry then adds the credit values of the value-bearing symbols 233, the collector symbol 1204, the collector symbol 1504, and the collector symbol 904. The total amount awarded can be described in a message 1602 presented via the display(s) 400. Furthermore, the total amount awarded can be shown in a win meter 204.

In addition to awarding the credit values to the credit meter 200, the game-logic circuitry adjusts the bonus spin counter 540 (processing block 322). For example, the game-logic circuitry decrements the bonus spin counter 540 by one for the current spin causing the bonus spins to end (processing block 324).

In addition to the embodiments described, in some embodiments a hierarchical collector symbol (or other such special symbol) can also include other features, such as a feature that multiplies credit values of value-bearing symbols of lesser rank without collecting them, or that multiplies certain types of symbols (e.g., symbols of a certain rank).

In this description, numerous specific details are set forth. However, it is understood that embodiments of the disclosure may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the disclosure. Further, separate references to "one embodiment" in this description do not necessarily refer to the same embodiment; however, neither are such embodiments mutually exclusive, unless so stated and except as will be readily apparent to those of ordinary skill in the art. Thus, the present disclosure can include any variety of combinations and/or integrations of the embodiments described herein. Each claim, as may be amended, constitutes an embodiment of the disclosure, incorporated by reference into the detailed description. Moreover, in this description, the phrase "exemplary embodiment" means that the embodiment being referred to serves as an example or illustration.

Block diagrams illustrate exemplary embodiments of the disclosure. Flow diagrams illustrate operations of the exemplary embodiments of the disclosure. The operations of the flow diagrams are described with reference to the example embodiments shown in the block diagrams. However, it should be understood that the operations of the flow diagrams could be performed by embodiments of the disclosure other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. An electronic gaming machine comprising:

a memory storing programming for a random number generator (RNG);

a presentation assembly configured to perform the operations that cause the gaming machine to present a plurality of mechanical reels and form an array, the plurality of mechanical reels bearing a plurality of symbols including value-bearing symbols and at least two special symbols comprising a first special symbol and a second special symbol, wherein the plurality of symbols are ranked according to a plurality of hierarchy collector ranks, wherein the value-bearing symbols have a lowest rank in the plurality of hierarchy collector ranks, wherein the at least two special symbols have ranks higher than the lowest rank, wherein each of the at least two special symbols has a different rank from each other within the plurality of hierarchy collector ranks, and wherein each one of the at least two special symbols is configured to collect symbols of a lesser rank than its own rank; and game-logic circuitry secured within a locked box inside a gaming cabinet of the electronic gaming machine, said game-logic circuitry configured to perform the operations that cause the gaming machine to:

prior to execution of a wagering game, execute an authentication program on the electronic gaming machine to authenticate the programming;

present, via the presentation assembly in response to user input, a series of spins of the plurality of mechanical reels, each spin including spinning and stopping the plurality of mechanical reels to randomly, using the RNG, land at least some of the plurality of symbols in the array, wherein a first one of the series of spins lands a set of the value-bearing symbols;

store, in the memory based on presentation of the first one of the series of spins, first coordinates of a set of cells associated with locations of the set of the value-bearing symbols within the array;

in response to presentation of a second one of the series of spins to land the first special symbol into a trigger cell of the array, collect, via automated presentation based on the plurality of hierarchy collector ranks, the set of the value-bearing symbols into the first special symbol, wherein collection of the set of value-bearing symbols into the first special symbol automatically morphs, via the presentation assembly, an appearance of an indicator on the first symbol in response to movement of the set of the value-bearing symbols from the first coordinates toward the first special symbol;

present, via the presentation assembly in response to automated presentation of the collection and the automated presentation of the movement, a removal of the set of value-bearing symbols from the array, wherein removal of the set of value-bearing symbols from the array frees up the set of cells at the first coordinates for potential appearance of additional value-bearing symbols within the array;

re-position, via the presentation assembly, the first special symbol from the trigger cell of the array to an additional cell in the array associated with second coordinates; and persist, in the additional cell via the presentation assembly, the first special symbol for one or more additional ones of the series of spins.

2. The gaming machine of claim 1, wherein the trigger cell is designated only for an initial random appearance of any of the at least two special symbols.

3. The gaming machine of claim 2, wherein the game-logic circuitry configured to perform the operations that cause the gaming system to collect the set of the value-bearing symbols into the first special symbol is further configured to perform operations that cause the gaming system to add a credit value of each one of the set of the value-bearing symbols to a credit value of the first special symbol.

4. The gaming machine of claim 3, wherein prior to an initial random appearance of the first special symbol in the trigger cell, the additional cell is occupied by at least one of the set of the value-bearing symbols, and wherein removal of the set of the value-bearing symbols from the array removes the at least one of the set of the value-bearing symbols, causing the additional cell to be unoccupied for re-positioning the first special symbol.

5. The gaming machine of claim 1, wherein in response to a third one of the series of spins landing, via the game-logic circuitry, the second special symbol, said game-logic circuitry is configured to perform operations that cause the gaming system to:

determine whether the second special symbol has a higher rank in the plurality of hierarchy collector ranks than the first special symbol; and in response to determination that the second special symbol has the higher rank in the plurality of hierarchy collector ranks than the first special symbol, collect into the second special symbol the first special symbol.

6. The gaming machine of claim 5, wherein the game-logic circuitry configured to perform the operations that collect into the second special symbol the first special symbol is further configured to perform operations that cause the gaming system to:

add a credit value of the first special symbol to a credit value of the second special symbol;

add any credit values from any value-bearing symbols within the array to the second special symbol; and remove the first special symbol from the array.

7. The gaming machine of claim 6, said game-logic circuitry further configured to perform operations that cause the gaming system to re-position the second special symbol from a trigger cell into an unoccupied cell of the array.

8. The gaming machine of claim 1, said game-logic circuitry further configured to perform operations that cause the gaming system to:

increase a number of the series of spins in response to one or more of the at least two special symbols appearing within the array, the second special symbol being ranked higher in the plurality of hierarchy collector ranks than the first special symbol, and wherein the second special symbol increases the number of the series of spins more than the first special symbol.

9. The gaming machine of claim 1, wherein the first special symbol is configured to collect one or more sets of value-bearing symbols within a pre-specified area being configurable as either an entire array area or a portion of the array.

10. The gaming machine of claim 9, wherein the portion of the array comprises one or more of a column, a row, or a section of the array, and wherein the portion of the array depends on which of the at least two special symbols lands in the array.

11. A method of operating an electronic gaming machine, the method comprising:

prior to execution of a wagering game, executing an authentication program on the gaming machine to authenticate programming associated with a random number generator (RNG) and stored on a memory, wherein game-logic circuitry and the memory of the electronic gaming machine are secured within a locked box inside a gaming cabinet of the electronic gaming machine;

presenting, by a presentation assembly, a plurality of mechanical reels and forming an array, the plurality of mechanical reels bearing a plurality of symbols including value-bearing symbols and at least two special symbols comprising a first special symbol and a second special symbol, wherein the plurality of symbols are ranked according to a plurality of hierarchy collector ranks, wherein the value-bearing symbols have a lowest rank in the plurality of hierarchy collector ranks, wherein the at least two special symbols have ranks higher than the lowest rank, wherein each of the at least two special symbols has a different rank from each other within the plurality of hierarchy collector tanks, and wherein each one of the at least two special symbols is configured to collect symbols of a lesser rank than its own rank;

presenting, by game-logic circuitry, a series of spins of the plurality of mechanical reels, each spin including spinning and stopping the plurality of mechanical reels to randomly, using the RNG, land at least some of the plurality of symbols in the array, wherein a first one of the series of spins lands a set of the value-bearing symbols;

storing, in the memory based on presenting the first one of the series of spins, first coordinates of a set of cells associated with locations of the set of the value-bearing symbols within the array;

in response to presenting a second one of the series of spins landing the first special symbol, collecting, via automated presentation by the game-logic circuitry based on the plurality of hierarchy collector ranks, the set of the value-bearing symbols into the first special symbol, wherein collection of the set of value-bearing symbols into the first special symbol automatically morphs, via the presentation assembly, an appearance of an indicator on the first symbol according to movement of the set of the value-bearing symbols from the first coordinates toward the first special symbol;

presenting, via the presentation assembly in response to automated presentation of the collection and the automated presentation of the movement, a removal of the set of value-bearing symbols from the array, wherein removal of the set of value-bearing symbols from the array frees up the set of cells at the first coordinates for potential appearance of additional value-bearing symbols within the array;

re-positioning, via the presentation assembly, the first special symbol from the trigger cell of the array to an additional cell in the array associated with second coordinates; and persisting, in the additional cell via the presentation assembly, the first special symbol for one or more additional ones of the series of spins.

12. The method of claim 11, wherein the trigger cell is designated only for an initial random appearance of any of the at least two special symbols.

13. The method of claim 12, wherein the collecting the set of the value-bearing symbols into the first special symbol comprises:

adding a credit value of each one of the set of the value-bearing symbols to a credit value of the first special symbol.

14. The method of claim 13, wherein prior to an initial random appearance of the first special symbol in the trigger cell, the additional cell is occupied by at least one of the set of the value-bearing symbols, and wherein removing the set of the value-bearing symbols from the array removes the at least one of the set of the value-bearing symbols, causing the additional cell to be unoccupied for re-positioning the first special symbol.

15. The method of claim 11, wherein in response to a third one of the series of spins landing, via the game-logic circuitry, the second special symbol, said method further comprising:

determining whether the second special symbol has a higher rank in the plurality of hierarchy collector ranks than the first special symbol; and in response to the determining that the second special symbol has the higher rank in the plurality of hierarchy collector ranks than the first special symbol, collecting into the second special symbol the first special symbol.

16. The method of claim 15, wherein the collecting into the second special symbol the first special symbol comprises:

adding a credit value of the first special symbol to a credit value of the second special symbol;

adding any credit values from any value-bearing symbols within the array to the second special symbol; and removing the first special symbol from the array.

17. The method of claim 16 further comprising re-positioning the second special symbol from a trigger cell into an unoccupied cell of the array.

18. The method of claim 11, further comprising:

increasing a number of the series of spins in response to one or more of the at least two special symbols appearing within the array, the second special symbol being ranked higher in the plurality of hierarchy collector ranks than the first special symbol, and wherein the second special symbol increases the number of the series of spins more than the first special symbol.

19. The method of claim 11, wherein the first special symbol is configured to collect one or more sets of value-bearing symbols within a pre-specified area being configurable as either an entire array area or a portion of the array.

20. The method of claim 19, wherein the portion of the array comprises one or more of a column, a row, or a section of the array, and wherein the portion of the array depends on which of the at least two special symbols lands in the array.

* * * * *